United States Patent
King et al.

(10) Patent No.: US 9,951,177 B2
(45) Date of Patent: *Apr. 24, 2018

(54) FLAME-RETARDANT POLYHYDROXYALKANOATE MATERIALS

(71) Applicant: International Business Machines Corporation, Armonk, NY (US)

(72) Inventors: Scott B. King, Rochester, MN (US); Brandon M. Kobilka, Tucson, AZ (US); Joseph Kuczynski, North Port, FL (US); Jason T. Wertz, Pleasant Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 40 days.

This patent is subject to a terminal disclaimer.

(21) Appl. No.: 15/078,370

(22) Filed: Mar. 23, 2016

(65) Prior Publication Data
US 2017/0275421 A1 Sep. 28, 2017

(51) Int. Cl.
C08F 30/02 (2006.01)
C08F 118/02 (2006.01)
C08G 63/692 (2006.01)

(52) U.S. Cl.
CPC .................. *C08G 63/692* (2013.01)

(58) Field of Classification Search
CPC ......... C08G 79/04; C08L 55/02; C08L 67/00; C08L 67/04; C08L 69/00; C08L 71/00; C08L 75/04; C08L 85/02

USPC .................................................. 526/274, 319
See application file for complete search history.

(56) References Cited

U.S. PATENT DOCUMENTS

| | | |
|---|---|---|
| 5,395,919 A | 3/1995 | Lee et al. |
| 6,071,998 A | 6/2000 | Muller et al. |
| 7,557,152 B2 | 7/2009 | Kanno et al. |
| 7,968,657 B2 | 6/2011 | Avakian |
| 8,796,363 B2 | 8/2014 | Harada et al. |
| 2014/0000751 A1* | 1/2014 | Kagumba ............ C08G 63/916 139/420 R |
| 2014/0235771 A1 | 8/2014 | Suwa et al. |
| 2014/0249255 A1 | 9/2014 | Harada et al. |
| 2015/0354311 A1 | 12/2015 | Okura et al. |

FOREIGN PATENT DOCUMENTS

| | | |
|---|---|---|
| CN | 1952040 A | 4/2007 |
| CN | 101838538 B | 7/2012 |
| CN | 102558698 B | 12/2014 |
| CN | 104513426 A | 4/2015 |
| CN | 104592475 A | 5/2015 |
| JP | 58183729 A | 10/1983 |
| JP | H01287117 A | 11/1989 |
| JP | H00440388 B2 | 7/1992 |

(Continued)

OTHER PUBLICATIONS

Park et al "Epoxidation of Bacterial Polyester with Unsaturated Side Chains", 1998.*

(Continued)

*Primary Examiner* — William Cheung
(74) *Attorney, Agent, or Firm* — Patterson + Sheridan, LLP

(57) ABSTRACT

A flame-retardant polyhydroxyalkanoate (PHA) material having a phosphate-terminated side-chain is disclosed.

20 Claims, 5 Drawing Sheets

(56) References Cited

FOREIGN PATENT DOCUMENTS

| JP | 2010006944 A | 1/2010 |
|----|--------------|--------|
| JP | 2010031230 A | 2/2010 |
| TW | I259188 B | 8/2006 |

OTHER PUBLICATIONS

Gagnon, et al., Chemical Modification of Bacterial Elastomers: 1. Peroxide Crosslinking, Polymer, vol. 35, Issue 20, Sep. 1994, (Abstract Only) viewed Feb. 10, 2016 http://www.sciencedirect.com/science/article/pii/0032386194900930, 2 pp.

Gagnon, et al., Chemical Modification of Bacterial Elastomers: 2. Sulfur Vulcanization, Polymer, vol. 35, Issue 20, Sep. 1994, (Abstract Only) viewed Feb. 10, 2016 http://www.sciencedirect.com/science/article/pii/0032386194900949, 2 pp.

Gomez, et al., "Making Green Polymers Even Greener: Towards Sustainable Production of Polyhydroxyalkanoates from Agroindustrial By-Products", Intech, Advances in Applied Biotechnology, Jan. 2012, 23 pp.

Biotechnology Forums, Bioplastics: Microbial Production of Polyhydroxyalkanoates (PHA's), viewed Feb. 10, 2016 http://www.biotechnologyforums.com/thread-2280.html, 6 pp.

Eroglu, et al., "Hydroxylation of Pendant Vinyl Groups of Poly(3-hydroxy Undec-10-enoate) in High Yield", Journal of Applied Polymer Science, vol. 97, 2005, 8 pp.

\* cited by examiner

FLAME-RETARDANT POLYHYDROXYALKANOATE MATERIALS

I. FIELD OF THE DISCLOSURE

The present disclosure relates generally to flame-retardant polyhydroxyalkanoate (PHA) materials.

II. BACKGROUND

Plastics are typically derived from a finite and dwindling supply of petrochemicals, resulting in price fluctuations and supply chain instability. Replacing non-renewable petroleum-based polymers with polymers derived from renewable resources may be desirable. However, there may be limited alternatives to petroleum-based polymers in certain contexts. To illustrate, particular plastics performance standards may be specified by a standards body or by a regulatory agency. In some cases, alternatives to petroleum-based polymers may be limited as a result of challenges associated with satisfying particular plastics performance standards.

III. SUMMARY OF THE DISCLOSURE

According to an embodiment, a process includes forming a PHA material having a vinyl-terminated side-chain from a biorenewable vinyl-terminated fatty acid via a bacterial fermentation process. The process also includes converting a vinyl group of the vinyl-terminated side-chain to a hydroxyl group and chemically reacting the hydroxyl group with a phosphonate material to form a flame-retardant PHA material.

According to another embodiment, a process includes converting a vinyl group of a biorenewable vinyl-terminated fatty acid to a hydroxyl group to form a hydroxyl-terminated fatty acid. The process also includes chemically reacting the hydroxyl group of the hydroxyl-terminated fatty acid with a phosphonate material to form a phosphate-terminated fatty acid. The process further includes forming a flame-retardant PHA material having a phosphate-terminated side-chain from the phosphate-terminated fatty acid via a bacterial fermentation process.

According to another embodiment, a flame-retardant PHA material having a phosphate-terminated side-chain is disclosed.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

IV. BRIEF DESCRIPTION OF THE DRAWINGS

V. DETAILED DESCRIPTION

The present disclosure relates to flame-retardant (FR) polyhydroxyalkanoate (PHA) materials and processes for forming FR PHA materials. As used herein, the term "PHA material" is used to refer to a poly(3-hydroxyalkanoate) material, which is a group of storage polymers produced by many types of bacteria in response to growth restriction by a nutrient other than the carbon source. To illustrate, *Pseudomonas oleovorans* is an example of a microorganism that produces PHAs with relatively long pendant side-chains. The long side-chains may contain some functionalities, such as olefins, that may provide sites for chemical modifications. In the present disclosure, a phosphorus-based cross-linker material may be chemically reacted with terminal vinyl groups on the side-chains of PHAs to form flame-retardant, cross-linked PHA materials.

Figure 1:
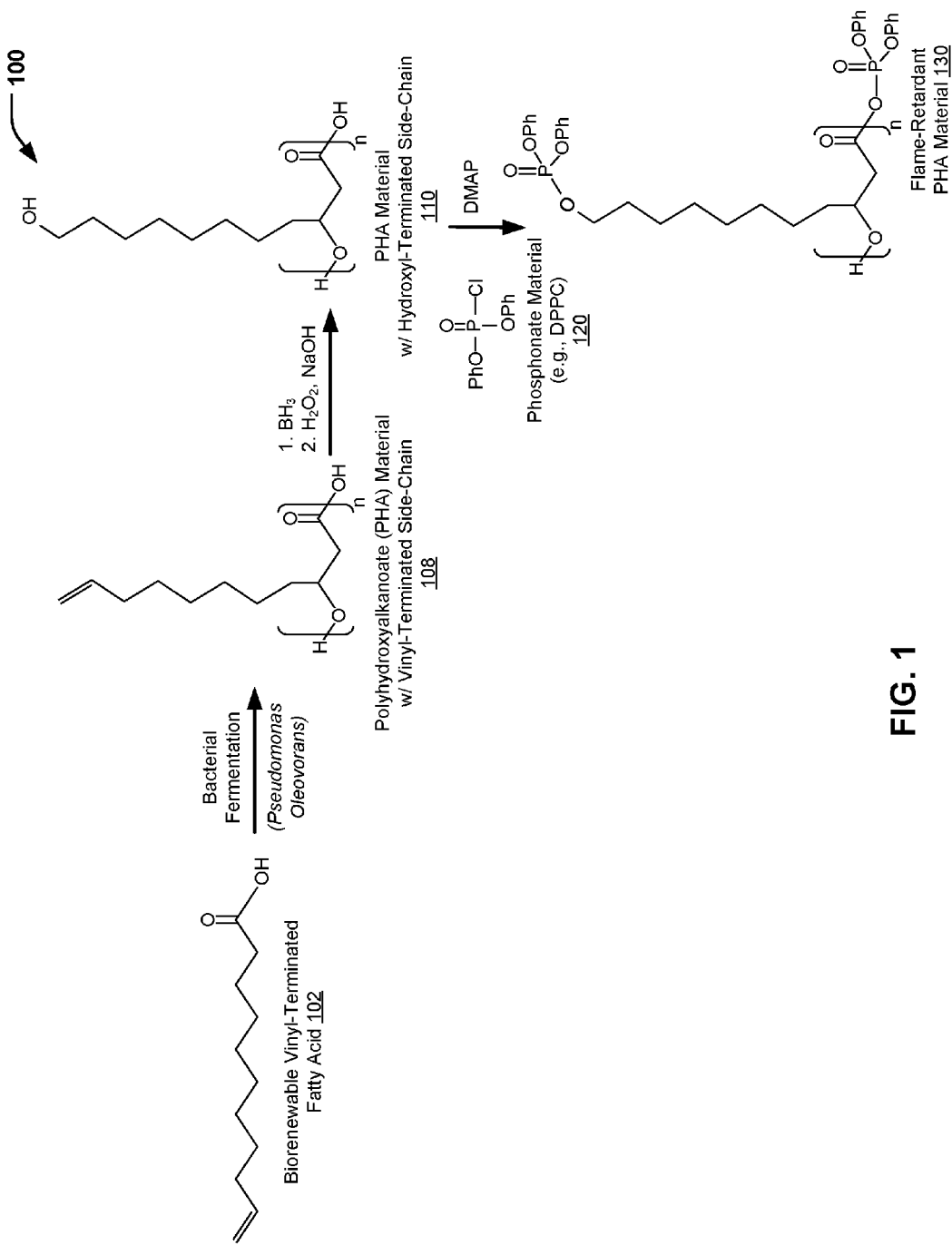
FIG. 1 is a chemical reaction diagram illustrating a process of forming a flame-retardant PHA material having a phosphate-terminated side-chain, according to one embodiment.

Referring to FIG. 1, a chemical reaction diagram 100 illustrates a particular embodiment of a process of forming a flame-retardant polyhydroxyalkanoate (PHA) material 130 having a phosphate-terminated side-chain. FIG. 1 illustrates the formation of a PHA material 108 having a vinyl-terminated side-chain from a vinyl-terminated fatty acid 102 via a bacterial fermentation process. While a single biorenewable vinyl-terminated fatty acid (e.g., 10-undecenoic acid) is illustrated in the example of FIG. 1, alternative and/or additional vinyl-terminated fatty acid(s) may be used in other cases. FIG. 1 further illustrates that a vinyl group of the vinyl-terminated side-chain of the PHA material 108 may be converted to a hydroxyl group to form a PHA material having a hydroxyl-terminated side-chain 110. The terminal hydroxyl group may be chemically reacted with a phosphonate material 120 to form the flame-retardant PHA material 130 having the phosphate-terminated side-chain.

In the particular embodiment illustrated in FIG. 1, the biorenewable vinyl-terminated fatty acid 102 includes 10-undecenoic acid. In some cases, the biorenewable vinyl-terminated fatty acid 102 (or multiple biorenewable vinyl-terminated fatty acids) may be formed from one or more biorenewable plant oils (e.g., castor oil in the case of 10-undecenoic acid). Other examples of biorenewable plant oils include vegetable oils, soybean oil, linseed oil, etc. Thus, while FIG. 1 illustrates one example of a single vinyl-terminated fatty acid, alternative and/or additional biorenewable vinyl-terminated fatty acid(s) of varying chain length may be used.

A bacterial fermentation process may be used to form the PHA material 108 having the vinyl-terminated side-chain. In the example of FIG. 1, *pseudomonas oleovorans* is illustrated as a bacterium that may be used for the bacterial fermentation process. Other suitable bacteria may be utilized in other cases. To illustrate, *pseudomonas oleovorans* may be grown in the presence of the biorenewable vinyl-terminated fatty acid 102 (e.g., 10-undecenoic acid in the example of FIG. 1), and the resulting polymer may be extracted from lyophilized cells using chloroform and precipitated with methanol.

The second chemical reaction depicted in FIG. 1 illustrates an example in which a terminal vinyl group of the PHA material 108 may be converted to a terminal hydroxyl group to form the PHA material 110 with the hydroxyl-terminated side-chain, which may be chemically reacted with the phosphonate material 120 to form the flame-retardant PHA material 130 having the phosphate-terminated side-chain. In alternative embodiments, the terminal vinyl group may be converted to a different reactive functionality that is suitable for chemical reaction with the phosphonate material 120.

In a particular embodiment (depicted as steps 1 and 2 in FIG. 1), the terminal vinyl group of the PHA material 108 may be converted to a terminal hydroxyl group via hydroboration chemistry. For example, hydroxylation of the PHA material 108 may be performed using borane or 9-borobicyclononane (9-BBN), which attaches only to the vinyl ends.

Prophetic Example: Hydroboration of
Vinyl-Terminated Side-Chain

To a dried reaction vessel charged with "PHA," under an inert atmosphere (argon/nitrogen), a mixture of anhydrous chloroform/THF (e.g., a ratio of about 1:6 to give a PHA concentration of about 0.1 M, but this ratio could be flexible) may be added. The reaction may be cooled to about 0° C., and a solution of borane (or other applicable reagent such as 9-BBN, or disiamylborane ≥1 equivalents per vinyl group) in THF may be added, dropwise. The reaction mixture may be warmed to room temperature and stirred for about 12 hours at room temperature. The reaction mixture may then be cooled to about 10° C., and a solution of NaOH may be added (3.0 M, in excess), followed by an addition of hydrogen peroxide (30 weight percent, in excess). The reaction mixture may be cooled to about −25° C., and a small amount of methanol (approx. 3% by volume) may be added, and the reaction may be stirred for a minimum of 10 minutes. A solution of 3M NaOH, approx. 5% by volume (approx. 1.3 equivalents), may then be added to the reaction mixture and may be stirred for about 15 minutes. A solution of hydrogen peroxide may then be added (approx. 30% in water, 3.5-4.0 equivalents). The reaction may be stirred at about −25° C. for about 1 hour, followed by a slow warming to about 40° C. over a time period of about 1 hour, followed by cooling to room temperature. The resulting solution may be filtered, and 1M HCl may be added dropwise until the reaction mixture reaches a neutral pH. The solvents may be removed in vacuo until a small amount remains, and the crude reaction mixture may be extracted with DMF, filtered, and the solvent removed in vacuo.

In a particular embodiment, the terminal hydroxyl group may be reacted with the phosphonate material 120 in solution or under melt conditions using an appropriate catalyst, such as dimethylaminopyridine (DMAP). In the particular embodiment illustrated in FIG. 1, the phosphonate material 120 is diphenyl chlorophosphonate (illustrated as "DPPC" in FIG. 1). In some cases, alternative and/or additional phosphonate materials may be utilized.

The right side of the second chemical reaction diagram of FIG. 1 illustrates that a hydroxyl group of the PHA material 110 with the hydroxyl-terminated side-chain chemically reacts with a chloride group of the phosphonate material 120, resulting in the formation of the flame-retardant PHA material 130 having the phosphate-terminated side-chain.

FIG. 1 further illustrates the chemical reaction of a terminal hydroxyl end group of the polymer main chain with the phosphonate material 120. Thus, the flame-retardant PHA material 130 includes repeating units (illustrated as "n" in FIG. 1) having the phosphate-terminated side-chain and a terminal phosphate end group.

Prophetic Example: Formation of FR PHA Material

Hydroxyl-functionalized PHA and a catalytic (approx. 5%) amount of 4-(dimethylaminopyridine) (DMAP) may be added to a dried reaction vessel under inert atmosphere. The two compounds may be dissolved in an organic solvent such as chloroform, THF, toluene, chlorobenzene etc., and the reaction may be carried out at or above room temperature, under reflux conditions. DPPC may be added dropwise to the reaction mixture while stirring. The reaction generates HCl gas which may be scavenged by venting to a vessel containing a basic, aqueous solution. The reaction may also be exposed to a reduced pressure to further drive off HCl gas and promote the reaction of DPPC with the hydroxyl groups. Upon completion, the reaction may be cooled to room temperature, and the crude product may be dissolved in an organic solvent such as chloroform, THF, toluene, chlorobenzene etc., if no solvent was used to conduct the reaction. The polymer may be precipitated by pouring the solution into an organic non-polar solvent such as hexane, methanol, ethanol, acetone, etc. Any resulting solids may be filtered and purified further by techniques known to those skilled in the arts, such as Soxhlet extraction.

In some cases, the mechanical properties of the flame-retardant PHA material 130 may be "tuned" by varying the length of the PHA material 108, which can be achieved by modifying reaction conditions, such as time, temperature, and the bacterium that is selected for fermentation.

In a particular embodiment, the flame-retardant PHA material 130 of FIG. 1 may be mixed with a second polymeric material (or multiple polymeric materials) to form a polymeric blend. In some cases, the second polymeric material may include a polylactic acid (PLA) material, a polyurethane material, a polycarbonate material, an acrylonitrile butadiene styrene (ABS) material, a polyester material, a polyether material, or a combination thereof.

Thus, FIG. 1 illustrates an example of a process of forming a flame-retardant PHA material using a phosphonate material to impart flame retardancy characteristics. FIG. 1 illustrates that, in some cases, the phosphate functional group may be added after a bacterial fermentation process. Alternatively, as illustrated and further described herein with respect to FIG. 2, the phosphate functional group may be added prior to a bacterial fermentation process. Biorenewable materials may be used to form the flame-retardant PHA material of FIG. 1, and the PHA material of FIG. 1 (or blends that include the PHA material of FIG. 1) may be used in various applications in order to increase a biorenewable content.

Figure 2:
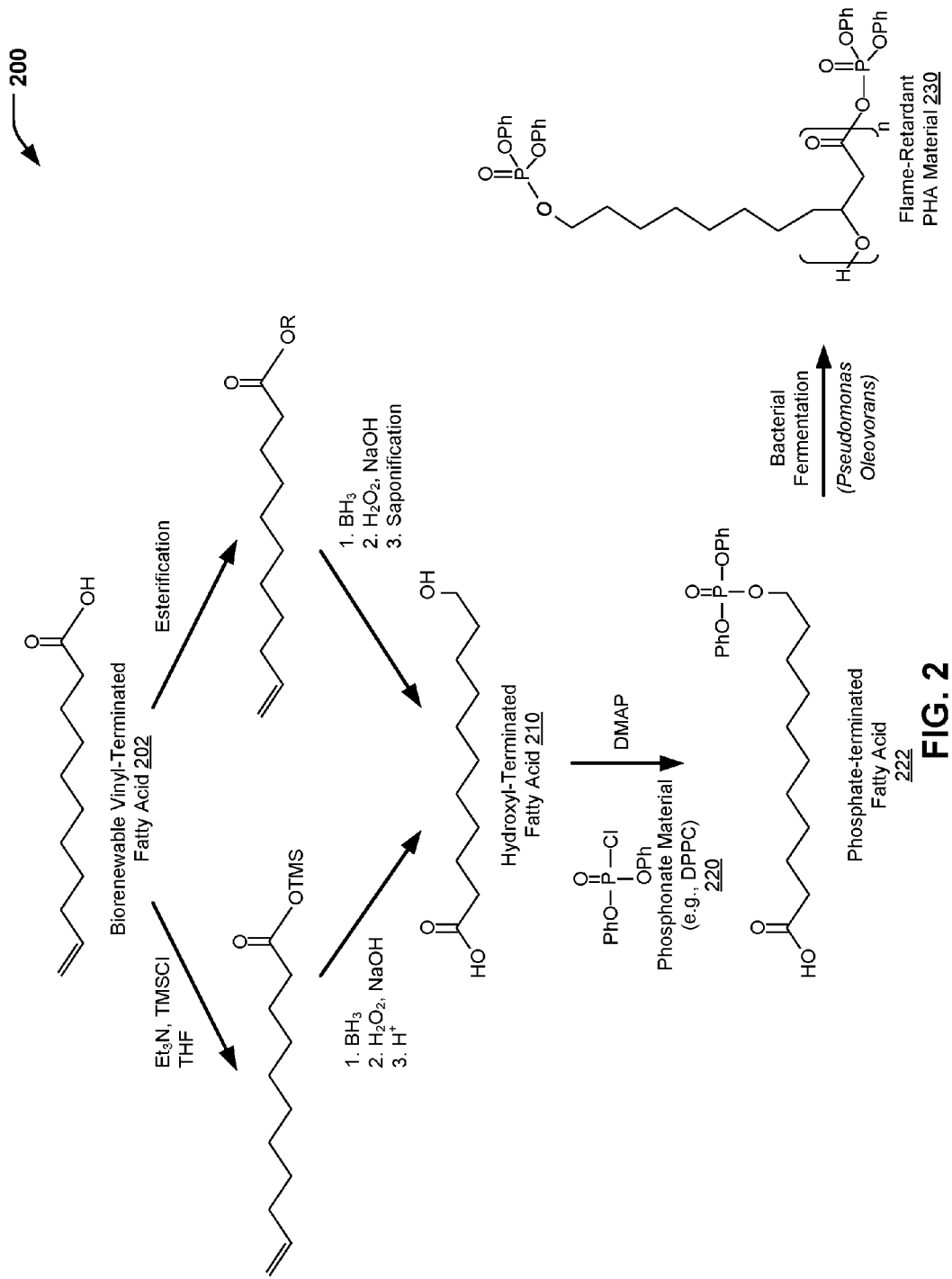
FIG. 2 is a chemical reaction diagram illustrating a process of forming a flame-retardant PHA material having a phosphate-terminated side-chain, according to one embodiment.

Referring to FIG. 2, a chemical reaction diagram 200 illustrates a particular embodiment of a process of forming a flame-retardant PHA material 230 having a phosphate-terminated side-chain. In the particular embodiment illustrated in FIG. 2, a phosphate group is added by converting a biorenewable vinyl-terminated fatty acid 202 to a hydroxyl-terminated fatty acid 210, which is subsequently reacted with a phosphonate material 220 to form a phosphate-terminated fatty acid 222. The flame-retardant PHA material 230 having the phosphate-terminated side-chain is formed from the phosphate-terminated fatty acid 222 via a bacterial fermentation process.

In the particular embodiment illustrated in FIG. 2, the biorenewable vinyl-terminated fatty acid 202 includes 10-undecenoic acid. In some cases, the biorenewable vinyl-terminated fatty acid 202 (or multiple biorenewable vinyl-terminated fatty acids) may be formed from one or more biorenewable plant oils (e.g., castor oil in the case of 10-undecenoic acid). Other examples of biorenewable plant oils include vegetable oils, soybean oil, linseed oil, etc. Thus, while FIG. 2 illustrates one example of a single vinyl-terminated fatty acid, alternative and/or additional biorenewable vinyl-terminated fatty acid(s) of varying chain length may be used.

In the first set of chemical reactions illustrated in FIG. 2, a terminal vinyl group of the biorenewable vinyl-terminated fatty acid 202 is converted to a terminal hydroxyl group, resulting in the formation of the hydroxyl-terminated fatty acid 210 (e.g., 11-hydroxyundecanoic acid). In a particular embodiment (depicted as steps 1 and 2 in FIG. 2), the terminal vinyl group of the biorenewable vinyl-terminated fatty acid 202 may be converted to the terminal hydroxyl group via hydroboration chemistry. For example, hydroxylation may be performed using borane or 9-borobicyclononane (9-BBN), which attaches only to the vinyl ends.

Prior to conversion of the terminal vinyl group to the terminal hydroxyl group, FIG. 2 two examples of processes of protecting a carboxylic acid group of the biorenewable vinyl-terminated fatty acid 202. In the first example (on the left side of FIG. 2), the carboxylic acid group is protected by a silyl ether (e.g., TMS, TBS, TPS, TIPS, etc.). The silyl ether may be removed by exposure to a low pH environment (depicted as step 3 in FIG. 3 following hydroboration). In the second example (on the right side of FIG. 2), the carboxylic acid group is converted into an ester (e.g., via a Fischer esterification). The ester may be converted back into a carboxylic acid group via saponification (depicted as step 3 in FIG. 3 following hydroboration). In some embodiments, the carboxylic acid group may remain "protected" through the phosphonate condensation reaction.

Prophetic Example 1: Formation of Hydroxyl-Terminated Fatty Acid

10-Undecenoic acid (or other terminal vinyl acid) may be protected with a silyl ether protecting group via a reaction with the appropriate silyl chloride (including trimethylsilyl (TMS), triethylsilyl (TES) tert-butyldimethylsilyl (TBDMS), tri-iso-propylsilyloxymethyl (TOM), dimethylphenylsilyl (DMPS) and triisopropylsilyl (TIPS) ethers) and an amine such as triethyleamine, or imidazole. The compound may be isolated and purified by techniques known to those skilled in the art.

To anhydrous tetrahydrofuran (THF) at about 0° C. under argon, a solution of borane (or 9-BBN, 1.0 M, 0.5-1 equivalents per carbonyl group) in THF may be added. While stirring, a solution of the silyl-protected 10-undecenoic acid (1 equiv.) dissolved in anhydrous THF (2.0 M) may be added, dropwise. The reaction mixture may be warmed to room temperature and stirred for about 2 hours. The reaction mixture may then be cooled to about 10° C., and a solution of NaOH may be added (3.0 M, in excess), followed by an addition of hydrogen peroxide (30 weight percent, in excess). The reaction mixture may be heated to about 50° C. for about 2 hours and then cooled to room temperature. Diethyl ether may be added to the reaction mixture, and the layers may be separated. The aqueous layer may be extracted with diethyl ether (e.g., 3 times). The combined organic layers may be washed with 3N HCl (e.g., 3 times—note: this may remove some of the silyl protecting groups), dried over $MgSO_4$, and filtered through a pad of silica gel. The solvents may be removed in vacuo, and further purification may be performed according to various techniques.

After the hydroboration is complete, the silyl protecting group may be removed by either raising or lowering the pH to an appropriate level for the selected silyl ether, or using a fluoride salt such as potassium fluoride, or tetrabutylammonia fluoride (TBAF).

Prophetic Example 2: Formation of Hydroxyl-Terminated Fatty Acid

10-Undecenoic acid (or other terminal vinyl acid) is converted into an ester by well-known chemistry such as the Fischer esterification using common, inexpensive, and readily available alcohols, sulfuric acid, and elevated temperatures. The compound is isolated and purified by techniques known to those skilled in the art.

To anhydrous tetrahydrofuran (THF) at about 0° C. under argon, a solution of borane (or 9-BBN, 1.0 M, 0.5-1 equivalents per carbonyl group) in THF may be added. While stirring, a solution of the esterified 10-undecenoic acid (1 equiv.) dissolved in anhydrous THF (2.0 M) may be added, dropwise. The reaction mixture may be warmed to room temperature and stirred for about 2 hours. The reaction mixture may then be cooled to about 10° C., and a solution of NaOH may be added (3.0 M, in excess), followed by an addition of hydrogen peroxide (30 weight percent, in excess). The reaction mixture may be heated to about 50° C. for about 2 hours and then cooled to room temperature. Diethyl ether may be added to the reaction mixture, and the layers may be separated. The aqueous layer may be extracted with diethyl ether (e.g., 3 times). The combined organic layers may be washed with 3N HCl (e.g., 3 times—note: this may remove some of the silyl protecting groups), dried over $MgSO_4$, and filtered through a pad of silica gel. The solvents may be removed in vacuo, and further purification may be performed according to various techniques.

After the hydroboration is complete, the carboxylic acid may be regenerated under standard saponification conditions.

The next chemical reaction depicted in FIG. 2 illustrates the chemical reaction of the terminal hydroxyl group of the hydroxyl-terminated fatty acid 210 with a phosphonate material 220 to form the phosphate-terminated fatty acid 222. In a particular embodiment, the terminal hydroxyl group may be reacted with the phosphonate material 220 in solution or under melt conditions using an appropriate catalyst (e.g., DMAP). In the particular embodiment illustrated in FIG. 2, the phosphonate material 220 is diphenyl chlorophosphonate (illustrated as "DPPC" in FIG. 2). In some cases, alternative and/or additional phosphonate materials may be utilized.

Prophetic Example: Formation of Phosphate-Terminated Fatty Acid 11-hydroxyundecanoic acid (1 eqiuv.) and a catalytic (approx. 5%) amount of 4-(dimethylaminopyridine) (DMAP) may be added to a dried reaction vessel under inert atmosphere. The two compounds may be dissolved in an organic solvent such as diethyl ether, dichloromethane, chloroform, THF, toluene, etc., and the reaction may be carried out at or above room temperature, under reflux conditions. Chlorodiphenylphosphonate (CDPP), also referred to as diphenyl chlorophosphonate (DPPC), may be added dropwise to the reaction mixture while stirring. The reaction generates HCl gas which may be scavenged by venting to a vessel containing a basic, aqueous solution. The reaction may also be exposed to a reduced pressure to further drive off HCl gas and promote the reaction of DPPC with the hydroxyl groups. Upon completion, the reaction may be cooled to room temperature, and the crude product may be dissolved in an organic solvent such as diethyl ether, dichloromethane, chloroform, THF, toluene, etc., if no solvent was used to conduct the reaction. The crude organic mixture may be rinsed with water, and the layers may be separated. The aqueous layer may be extracted with additional organic solvent (e.g., 3 times). The combined organic layers may be washed with aqueous sodium bicarbonate (e.g., 3 times), dried over $MgSO_4$, and filtered through a pad of silica gel. The solvents may be removed in vacuo, and further purification may be performed according to various techniques.

The next chemical reaction depicted in FIG. 2 illustrates that the flame-retardant PHA material 230 having the phosphate-terminated side-chain may be formed from the phosphate-terminated fatty acid 222 via a bacterial fermentation process. In the example of FIG. 2, *pseudomonas oleovorans* is illustrated as a bacterium that may be used for the bacterial fermentation process. Other suitable bacteria may be utilized in other cases. To illustrate, *pseudomonas oleovorans* may be grown in the presence of the phosphate-terminated fatty acid 222, and the resulting polymer may be extracted from lyophilized cells using chloroform and precipitated with methanol.

In some cases, the mechanical properties of the flame-retardant PHA material 230 having the phosphate-terminated side-chain may be "tuned" by modifying reaction conditions, such as time, temperature, and the bacterium that is selected for fermentation.

In a particular embodiment, the flame-retardant PHA material 230 having the phosphate-terminated side-chain of FIG. 2 may be mixed with a second polymeric material (or multiple polymeric materials) to form a polymeric blend. In some cases, the second polymeric material may include a PLA material, a polyurethane material, a polycarbonate material, an ABS material, a polyester material, a polyether material, or a combination thereof.

Thus, FIG. 2 illustrates an example of a process of forming a flame-retardant PHA material by chemically bonding a phosphate group to a side-chain in order to impart flame retardancy characteristics. In FIG. 2, biorenewable vinyl-terminated fatty acid(s) are converted to phosphate-terminated fatty acid(s) prior to a bacterial fermentation process. Thus, FIGS. 1 and 2 illustrate that, in some cases, the phosphate functional group may be added after a bacterial fermentation process (FIG. 1), while in other cases the phosphate functional group may be added prior to a bacterial fermentation process. In either case, chemically bonding the phosphate group to a side-chain of the PHA material may impart flame retardancy characteristics to the PHA material. Biorenewable materials may be used to form the flame-retardant PHA material of FIG. 2, and the PHA material of FIG. 2 (or blends that include the PHA material of FIG. 2) may be used in various applications in order to increase a biorenewable content.

Figure 3:
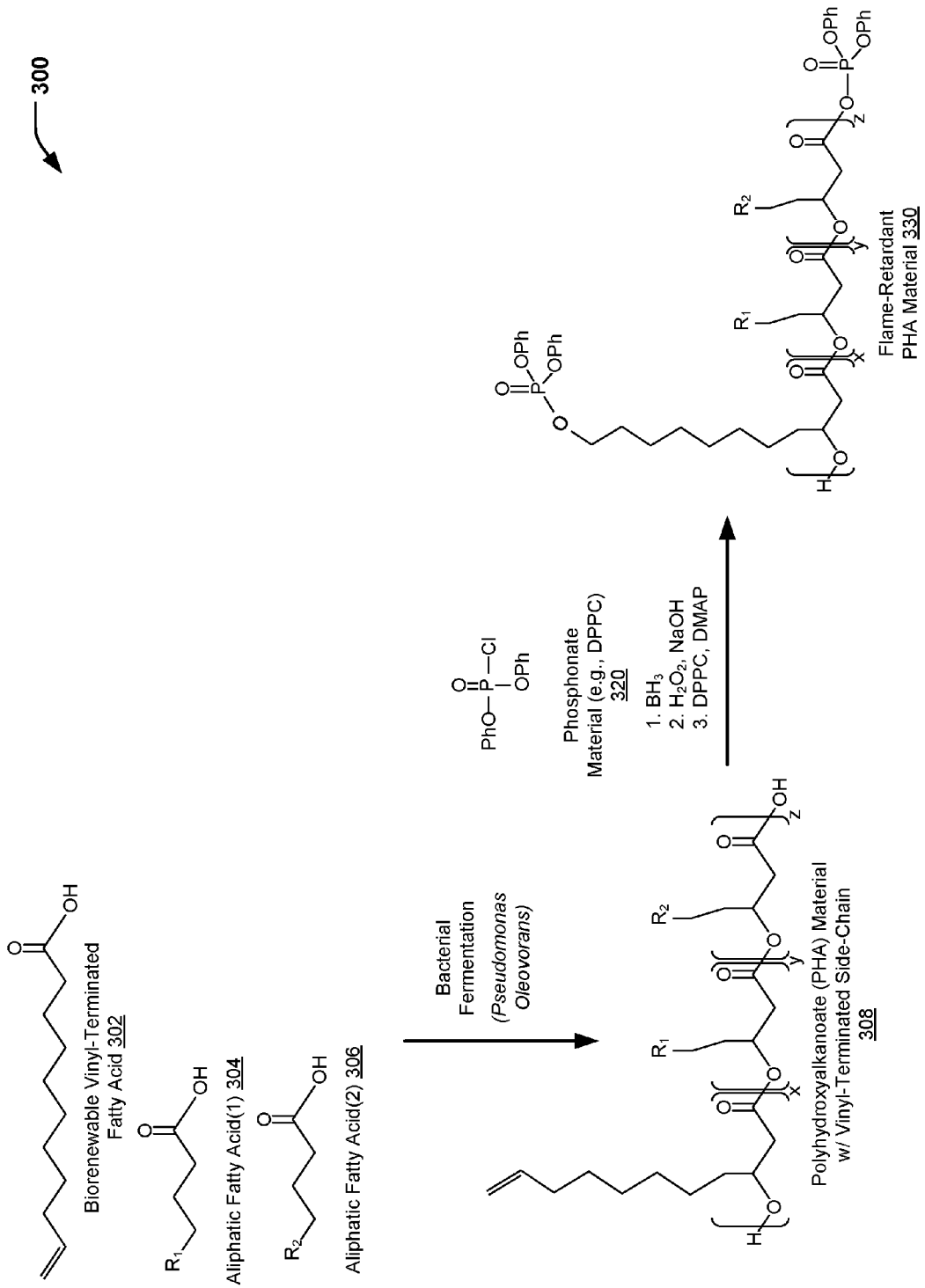
FIG. 3 is a chemical reaction diagram illustrating a process of forming a flame-retardant PHA material having a phosphate-terminated side-chain, according to one embodiment.

Referring to FIG. 3, a chemical reaction diagram 300 illustrates a particular embodiment of a process of forming a flame-retardant PHA material 330 having a phosphate-terminated side-chain. The first chemical reaction depicted in FIG. 3 illustrates the formation of a PHA material 308 having a vinyl-terminated side-chain from a mixture of vinyl-terminated fatty acid(s) and aliphatic fatty acid(s) via a bacterial fermentation process. In the example of FIG. 3, the mixture includes a (single) biorenewable vinyl-terminated fatty acid 302 (e.g., 10-undecenoic acid), a first aliphatic fatty acid 304 (identified as "Aliphatic Fatty Acid (1)" in FIG. 3), and a second aliphatic fatty acid 306 (identified as "Aliphatic Fatty Acid(2)" in FIG. 3). In alternative embodiments, the mixture may include alternative and/or additional vinyl-terminated fatty acid(s), aliphatic fatty acid(s), or a combination thereof. The second chemical reaction depicted in FIG. 3 illustrates that a vinyl group of the vinyl-terminated side-chain of the PHA material 308 may be converted to a hydroxyl group, which may be chemically reacted with a phosphonate material 320 to form the flame-retardant PHA material 330 having the phosphate-terminated side-chain.

In the particular embodiment illustrated in FIG. 3, the biorenewable vinyl-terminated fatty acid 302 includes 10-undecenoic acid. In some cases, the biorenewable vinyl-terminated fatty acid 302 (or multiple biorenewable vinyl-terminated fatty acids) may be formed from one or more biorenewable plant oils (e.g., castor oil in the case of 10-undecenoic acid). Other examples of biorenewable plant oils include vegetable oils, soybean oil, linseed oil, etc. Thus, while FIG. 3 illustrates one example of a single vinyl-terminated fatty acid, alternative and/or additional biorenewable vinyl-terminated fatty acid(s) of varying chain length may be used.

In the example of FIG. 3, two aliphatic fatty acids are illustrated on the left side of the first chemical reaction diagram, with the first aliphatic fatty acid 304 including a terminal "$R_1$" group and the second aliphatic fatty acid 306 including a terminal "$R_2$" group in order to distinguish the two aliphatic fatty acids. Illustrative, non-limiting examples of aliphatic fatty acids may include hexanoic acid, heptanoic acid, octanoic acid, nonanoic acid, decanoic acid, or undecanoic acid (among other alternatives). In a particular embodiment, at least one of the aliphatic fatty acids 304, 306 includes octanoic acid, and the biorenewable vinyl-terminated fatty acid 302 includes 10-undecenoic acid.

As described further herein, the bacterial fermentation process results in the PHA material 308 having the vinyl-terminated side-chain. The PHA material 308 with the vinyl-terminated side-chain includes a first portion (x) corresponding to the biorenewable vinyl-terminated fatty acid 302, a second portion (y) corresponding to the first aliphatic fatty acid 304 (with the terminal $R_1$ group), and a third portion (z) corresponding to the second aliphatic fatty acid 306 (with the terminal $R_2$ group). As described further herein, the portions x, y, z may be adjusted by varying stoichiometric ratio(s), reaction condition(s), or a combination thereof.

A bacterial fermentation process may be used to form the PHA material 308 having the vinyl-terminated side-chain. In the example of FIG. 3, *pseudomonas oleovorans* is illustrated as a bacterium that may be used for the bacterial fermentation process. Other suitable bacteria may be utilized in other cases. To illustrate, *pseudomonas oleovorans* may be grown in the presence of the biorenewable vinyl-terminated fatty acid 302 (e.g., 10-undecenoic acid in the example of FIG. 1) and the aliphatic fatty acids 304 and 306, and the resulting polymer may be extracted from lyophilized cells using chloroform and precipitated with methanol.

In some cases, one or more properties of the PHA material 308 with the vinyl-terminated side-chain may be "tunable" via selection of biorenewable vinyl-terminated fatty acid(s) of varying chain length, aliphatic fatty acid(s) of varying chain length, aliphatic fatty acid(s) having internal vinyl group(s), or a combination thereof (among other alternatives). To illustrate, chain length(s), internal vinyl group(s), etc. may affect properties such as glass transition temperature, melting temperature, and/or various materials characteristics (e.g., impact resistance, compression properties, etc.). As an illustrative, non-limiting example, the $R_1$ group of the first aliphatic fatty acid 304 may represent a longer chain than the $R_2$ group of the second aliphatic fatty acid 306. In this example, the portion (y) of the PHA material 308 corresponding to the first aliphatic fatty acid 304 represents a "longer chain component," and the portion (z) of the PHA material 308 corresponding to the second aliphatic fatty acid 306 represents a "shorter chain component."

The second chemical reaction depicted in FIG. 3 illustrates an example in which a terminal vinyl group of the PHA material 308 may be converted to a terminal hydroxyl group, which may be chemically reacted with the phosphonate material 320 to form the flame-retardant PHA material 330 having the phosphate-terminated side-chain. In alternative embodiments, the terminal vinyl group may be converted to a different reactive functionality that is suitable for chemical reaction with the phosphonate material 320.

In a particular embodiment (depicted as steps 1 and 2 in FIG. 3), the terminal vinyl group of the PHA material 308 may be converted to a terminal hydroxyl group via hydroboration chemistry. For example, hydroxylation of the PHA material 308 may be performed using borane or 9-borobicyclononane (9-BBN), which attaches only to the vinyl ends.

Prophetic Example: Hydroboration of Vinyl-Terminated Side-Chain

To a dried reaction vessel charged with "PHA," under an inert atmosphere (argon/nitrogen), a mixture of anhydrous chloroform/THF (e.g., a ratio of about 1:6 to give a PHA concentration of about 0.1 M, but this ratio could be flexible) may be added. The reaction may be cooled to about 0° C., and a solution of borane (or other applicable reagent such as 9-BBN, or disiamylborane ≥1 equivalents per vinyl group) in THF may be added, dropwise. The reaction mixture may be warmed to room temperature and stirred for about 12 hours at room temperature. The reaction mixture may then be cooled to about 10° C., and a solution of NaOH may be added (3.0 M, in excess), followed by an addition of hydrogen peroxide (30 weight percent, in excess). The reaction mixture may be cooled to about −25° C., and a small amount of methanol (approx. 3% by volume) may be added, and the reaction may be stirred for a minimum of 10 minutes. A solution of 3M NaOH, approx. 5% by volume (approx. 1.3 equivalents), may then be added to the reaction mixture and may be stirred for about 15 minutes. A solution of hydrogen peroxide may then be added (approx. 30% in water, 3.5-4.0 equivalents). The reaction may be stirred at about −25° C. for about 1 hour, followed by a slow warming to about 40° C. over a time period of about 1 hour, followed by cooling to room temperature. The resulting solution may be filtered, and 1M HCl may be added dropwise until the reaction mixture reaches a neutral pH. The solvents may be removed in vacuo until a small amount remains, and the crude reaction mixture may be extracted with DMF, filtered, and the solvent removed in vacuo.

In a particular embodiment (depicted as step 3 in FIG. 1), the terminal hydroxyl group may be reacted with the phosphonate material 320 in solution or under melt conditions using an appropriate catalyst, such as DMAP. In the particular embodiment illustrated in FIG. 3, the phosphonate material 320 is diphenyl chlorophosphonate (illustrated as "DPPC" in FIG. 3). In some cases, alternative and/or additional phosphonate materials may be utilized.

The right side of the second chemical reaction diagram of FIG. 3 illustrates that a hydroxyl group of a hydroxyl-terminated side-chain of the PHA material 308 chemically reacts with a chloride group of the phosphonate material 320, resulting in the formation of the flame-retardant PHA material 330 having the phosphate-terminated side-chain.

Prophetic Example: Formation of FR PHA Material

Hydroxyl-functionalized PHA and a catalytic (approx. 5%) amount of 4-(dimethylaminopyridine) (DMAP) may be added to a dried reaction vessel under inert atmosphere. The two compounds may be dissolved in an organic solvent such as chloroform, THF, toluene, chlorobenzene etc., and the reaction may be carried out at or above room temperature, under reflux conditions. DPPC may be added dropwise to the reaction mixture while stirring. The reaction generates HCl gas which may be scavenged by venting to a vessel containing a basic, aqueous solution. The reaction may also be exposed to a reduced pressure to further drive off HCl gas and promote the reaction of DPPC with the hydroxyl groups. Upon completion, the reaction may be cooled to room temperature, and the crude product may be dissolved in an organic solvent such as chloroform, THF, toluene, chlorobenzene etc., if no solvent was used to conduct the reaction. The polymer may be precipitated by pouring the solution into an organic non-polar solvent such as hexane, methanol, ethanol, acetone, etc. Any resulting solids may be filtered and purified further by techniques known to those skilled in the arts, such as Soxhlet extraction.

In some cases, the mechanical properties of the flame-retardant PHA material 330 having the phosphate-terminated side-chain may be "tuned" by varying the chain length of the aliphatic fatty acid(s) used to form the PHA material 308 with the vinyl-terminated side-chain, or by varying the length of the PHA material 308, which can be achieved by modifying reaction conditions, such as time, temperature, and the bacterium that is selected for fermentation. The mechanical properties may also be controlled by varying the ratio of the initial blend/feed of vinyl-functionalized fatty acid(s) to aliphatic fatty acid(s). In a particular embodiment, the flame-retardant PHA material 330 having the phosphate-terminated side-chain of FIG. 3 may be mixed with a second polymeric material (or multiple polymeric materials) to form a polymeric blend. In some cases, the second polymeric material may include a PLA material, a polyurethane material, a polycarbonate material, an ABS material, a polyester material, a polyether material, or a combination thereof.

Thus, FIG. 3 illustrates an example of a process of forming a flame-retardant PHA material using a phosphonate material to impart flame retardancy characteristics by forming phosphate-terminated side-chains on the PHA main polymer chain. Biorenewable materials may be used to form the flame-retardant PHA material of FIG. 3, and the PHA material of FIG. 3 (or blends that include the PHA material of FIG. 3) may be used in various applications in order to increase a biorenewable content.

Figure 4:
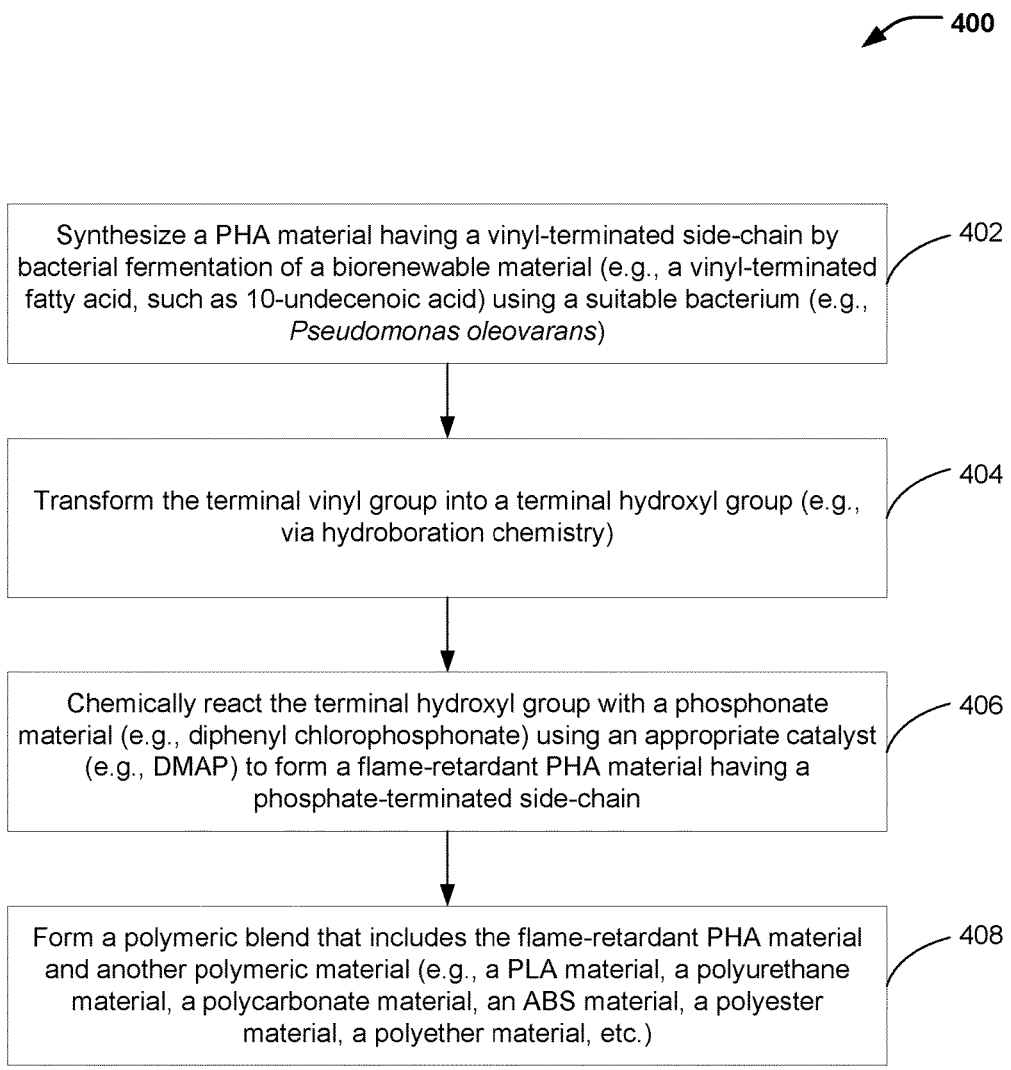
FIG. 4 is a flow diagram showing a particular embodiment of a process of forming a flame-retardant PHA material having a phosphate-terminated side-chain.

Referring to FIG. 4, a flow diagram illustrates a process 400 of forming a flame-retardant PHA material, according to a particular embodiment. In the particular embodiment illustrated in FIG. 4, the process 400 includes utilizing the flame-retardant PHA material as a component of a polymeric blend. In other cases, the flame-retardant PHA material may be used as a standalone polymeric material.

In the particular embodiment illustrated in FIG. 4, operations associated with an example process of producing a flame-retardant PHA material are identified as operations 402-406. It will be appreciated that the operations shown in FIG. 4 are for illustrative purposes only and that the chemical reactions may be performed in alternative orders, at alternative times, by a single entity or by multiple entities, or a combination thereof. As an example, one entity may produce biorenewable vinyl-terminated fatty acid(s), another entity may produce PHA material(s) with vinyl-terminated side-chain(s), while another entity may produce flame-retardant PHA material(s). Further, alternative or additional entities may perform operations associated with forming a polymeric blend that includes the flame-retardant PHA material and another polymeric material (illustrated as operation 408).

The process 400 includes synthesizing a PHA material having a vinyl-terminated side-chain by bacterial fermentation of a biorenewable material using a suitable bacterium, at 402. For example, referring to FIG. 1, a bacterial fermentation process (e.g., using *pseudomonas oleovarans* bacteria) of a biorenewable vinyl-terminated fatty acid 102 results in the formation of the PHA material 108 having the vinyl-terminated side-chain. In some cases, the PHA material having the vinyl-terminated side-chain may be formed from a mixture of biorenewable vinyl-terminated fatty acid (s) and aliphatic fatty acid(s). For example, referring to FIG. 3, the left side of the first chemical reaction illustrates a mixture that includes the biorenewable vinyl-terminated fatty acid 302, the first aliphatic fatty acid 304, and the second aliphatic fatty acid 306. The right side of the first chemical reaction diagram of FIG. 3 illustrates that a bacterial fermentation process (e.g., using *pseudomonas oleovarans* bacteria) results in the formation of the PHA material 308 having the vinyl-terminated side-chain.

The process 400 includes transforming the terminal vinyl group into a terminal hydroxyl group, at 404. For example, referring to FIG. 1, hydroboration chemistry may be used to convert a terminal vinyl group of the PHA material 108 to a terminal hydroxyl group. As another example, referring to FIG. 3, hydroboration chemistry may be used to convert a terminal vinyl group of the PHA material 308 to a terminal hydroxyl group.

The process 400 includes chemically reacting the terminal hydroxyl group with a phosphorus-based material to form a flame-retardant PHA material, at 406. In some cases, the terminal hydroxyl group may be chemically reacted with the phosphonate material in the presence of a suitable catalyst (e.g., DMAP). For example, referring to FIG. 1, a terminal hydroxyl group of the PHA material 110 with the hydroxyl-terminated side-chain chemically reacts with a functional group of the phosphonate material 120 (e.g., a chloride group of DPPC), resulting in the formation of the flame-retardant PHA material 120. As another example, referring to FIG. 3, hydroboration chemistry may be used to convert the vinyl group of the PHA material 308 with the vinyl-terminated side-chain to a terminal hydroxyl group. The terminal hydroxyl group may chemically react with a functional group of the phosphonate material 320 (e.g., a chloride group of DPPC), resulting in the formation to the flame-retardant PHA material 330 having the phosphate-terminated side-chain.

In the particular embodiment illustrated in FIG. 4, the process 400 further includes forming a polymeric blend that includes a first polymeric material and the flame-retardant PHA material, at 408. For example, the first polymeric material may include a PLA material, a polyurethane material, a polycarbonate material, an ABS material, a polyester material, a polyether material, or a combination thereof.

Thus, FIG. 4 illustrates an example of a process of forming a flame-retardant PHA material. In the example of FIG. 4, the addition of the flame-retardant PHA material of the present disclosure may be used to increase a biorenewability content of a polymeric material for use in various applications. In other cases, the flame-retardant PHA material of the present disclosure may be used as a standalone polymeric material.

Figure 5:
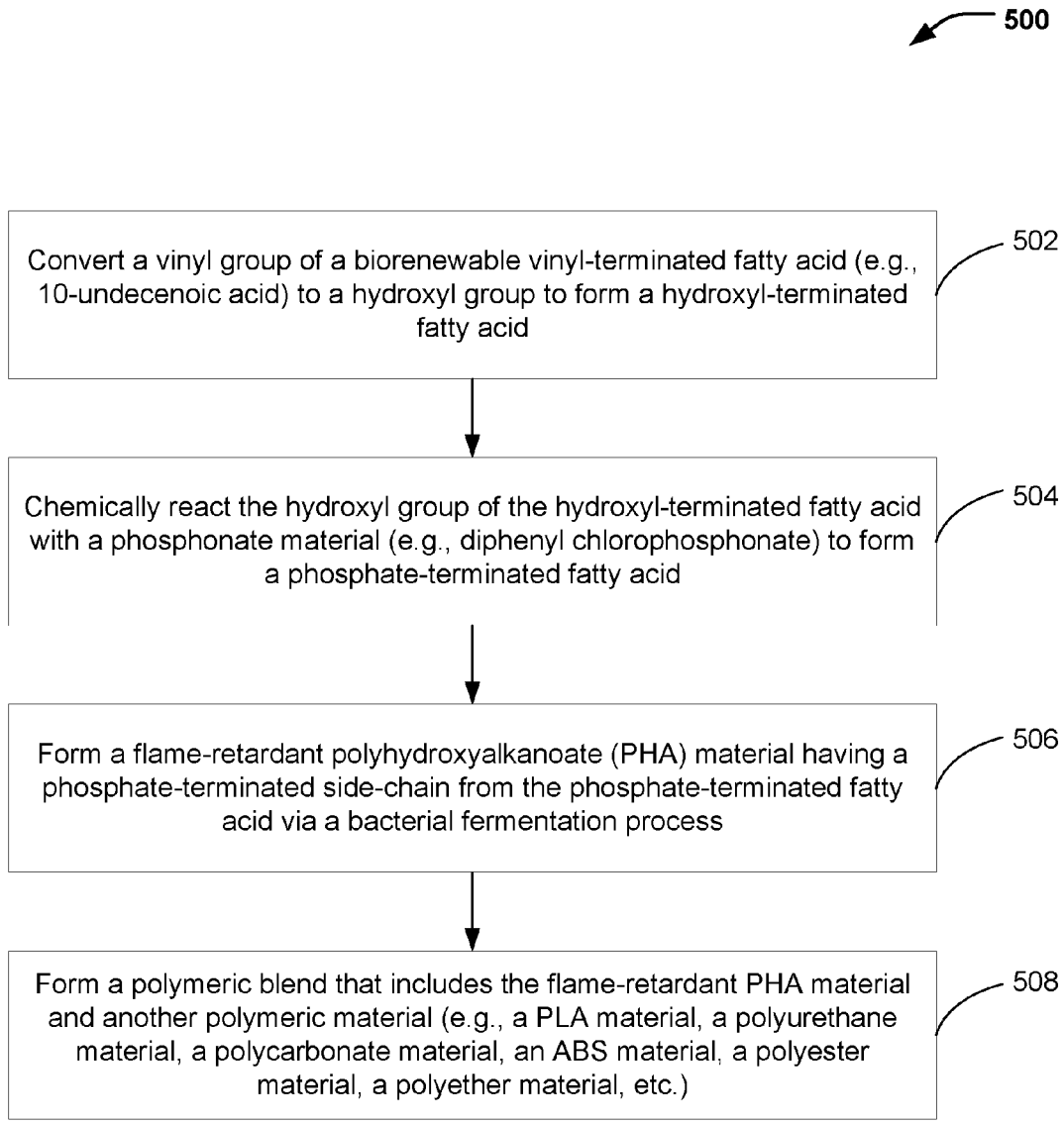
FIG. 5 is a flow diagram showing a particular embodiment of a process of forming a flame-retardant PHA material having a phosphate-terminated side-chain.

Referring to FIG. 5, a flow diagram illustrates a process 500 of forming a flame-retardant PHA material, according to a particular embodiment. In the particular embodiment illustrated in FIG. 5, the process 500 includes utilizing the flame-retardant PHA material as a component of a polymeric blend. In other cases, the flame-retardant PHA material may be used as a standalone polymeric material.

In the particular embodiment illustrated in FIG. 5, operations associated with an example process of producing a flame-retardant PHA material are identified as operations 502-506. It will be appreciated that the operations shown in FIG. 5 are for illustrative purposes only and that the chemical reactions may be performed in alternative orders, at alternative times, by a single entity or by multiple entities, or a combination thereof. As an example, one entity may produce biorenewable vinyl-terminated fatty acid(s), another entity may produce PHA material(s) with vinyl-terminated side-chain(s), while another entity may produce flame-retardant PHA material(s). Further, alternative or additional entities may perform operations associated with forming a polymeric blend that includes the flame-retardant PHA material and another polymeric material (illustrated as operation 508).

The process 500 includes converting a vinyl group of a biorenewable vinyl-terminated fatty acid to a hydroxyl group to form a hydroxyl-terminated fatty acid, at 502. For example, referring to FIG. 2, the first chemical reaction illustrates that a terminal vinyl group of the biorenewable vinyl-terminated fatty acid 202 (e.g., 10-undecenoic acid) may be converted to a terminal hydroxyl group, resulting in the formation of the hydroxyl-terminated fatty acid 210 (e.g., 11-hydroxyundecanoic acid). In some cases, hydroboration chemistry may be used to convert a terminal vinyl group of the biorenewable vinyl-terminated fatty acid 102 to a terminal hydroxyl group.

The process 500 includes chemically reacting the hydroxyl group of the hydroxyl-terminated fatty acid with a phosphonate material to form a phosphate-terminated fatty acid, at 504. In some cases, the terminal hydroxyl group may be chemically reacted with the phosphonate material in the presence of a suitable catalyst (e.g., DMAP). For example, referring to FIG. 2, the second chemical reaction illustrates that the hydroxyl group of the hydroxyl-terminated fatty acid 210 chemically reacts with a functional group of the phosphonate material 220 (e.g., a chloride group of DPPC), resulting in the formation of the phosphate-terminated fatty acid 222.

The process 500 includes forming a flame-retardant PHA material having a phosphate-terminated side-chain from the phosphate-terminated fatty acid via a bacterial fermentation process, at 506. For example, referring to FIG. 2, the third chemical reaction illustrates that the flame-retardant PHA material 230 having the phosphate-terminated side-chain may be formed from the phosphate-terminated fatty acid 222 via a bacterial fermentation process using a suitable bacterium (e.g., using *pseudomonas oleovarans* bacteria).

In the particular embodiment illustrated in FIG. 5, the process 500 further includes forming a polymeric blend that includes a first polymeric material and the flame-retardant PHA material, at 508. For example, the first polymeric material may include a PLA material, a polyurethane material, a polycarbonate material, an ABS material, a polyester material, a polyether material, or a combination thereof.

Thus, FIG. 5 illustrates an example of a process of forming a flame-retardant PHA material. In the example of FIG. 5, the addition of the flame-retardant PHA material of the present disclosure may be used to increase a biorenewability content of a polymeric material for use in various applications. In other cases, the flame-retardant PHA material of the present disclosure may be used as a standalone polymeric material.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A process comprising:
   forming a polyhydroxyalkanoate (PHA) material having a vinyl-terminated side-chain from a biorenewable vinyl-terminated fatty acid via a bacterial fermentation process;
   converting a vinyl group of the vinyl-terminated side-chain to a hydroxyl group; and
   chemically reacting the hydroxyl group with a phosphonate material to form a flame-retardant PHA material.

2. The process of claim 1, wherein the biorenewable vinyl-terminated fatty acid is formed from a biorenewable plant oil.

3. The process of claim 2, wherein the biorenewable plant oil includes castor oil, linseed oil, soybean oil, or a combination thereof.

4. The process of claim 1, wherein the biorenewable vinyl-terminated fatty acid includes 10-undecenoic acid.

5. The process of claim 1, wherein the phosphonate material includes diphenyl chlorophosphonate.

6. The process of claim 1, wherein the hydroxyl group is chemically reacted with the phosphorus-based material in the presence of a catalyst.

7. The process of claim 6, wherein the catalyst includes dimethylaminopyridine (DMAP).

8. The process of claim 1, wherein the vinyl group is converted to the hydroxyl group via hydroboration chemistry.

9. The process of claim 1, further comprising forming a polymeric blend that includes the flame-retardant PHA material and a second polymeric material.

10. The process of claim 9, wherein the second polymeric material includes a polylactic acid (PLA) material, a polyurethane material, a polycarbonate material, an acrylonitrile butadiene styrene (ABS) material, a polyester material, a polyether material, or a combination thereof.

11. A process comprising:
    converting a vinyl group of a biorenewable vinyl-terminated fatty acid to a hydroxyl group to form a hydroxyl-terminated fatty acid;
    chemically reacting the hydroxyl group of the hydroxyl-terminated fatty acid with a phosphonate material to form a phosphate-terminated fatty acid; and
    forming a flame-retardant polyhydroxyalkanoate (PHA) material having a phosphate-terminated side-chain from the phosphate-terminated fatty acid via a bacterial fermentation process.

12. The process of claim 11, wherein the biorenewable vinyl-terminated fatty acid includes 10-undecenoic acid.

13. The process of claim 11, wherein the phosphonate material includes diphenyl chlorophosphonate.

14. The process of claim 11, further comprising forming a polymeric blend that includes the flame-retardant PHA material and a second polymeric material.

15. A process comprising:
    forming a polyhydroxyalkanoate (PHA) material having a vinyl-terminated side-chain from a biorenewable vinyl-terminated fatty acid via a bacterial fermentation process, the biorenewable vinyl-terminated fatty acid being derived from a biorenewable plant oil;
    converting a vinyl group of the vinyl-terminated side-chain to a hydroxyl group; and
    chemically reacting the hydroxyl group with a phosphonate material in the presence of a catalyst to form a flame-retardant PHA material.

16. The process of claim 15, wherein the biorenewable plant oil includes castor oil, linseed oil, soybean oil, or a combination thereof.

17. The process of claim 15, wherein the phosphonate material includes diphenyl chlorophosphonate.

18. The process of claim 15, wherein the catalyst includes dimethylaminopyridine (DMAP).

19. The process of claim 15, wherein the vinyl group is converted to the hydroxyl group via hydroboration chemistry.

20. The process of claim 15, further comprising forming a polymeric blend that includes the flame-retardant PHA material and a second polymeric material.

* * * * *